(No Model.)

J. E. TURNER.
WIRE FENCE STAY.

No. 558,534.  Patented Apr. 21, 1896.

WITNESSES:
Lester L. Allen
A. J. Frorins

INVENTOR
John E. Turner,
BY
R. J. McCarty,
ATTORNEY.

UNITED STATES PATENT OFFICE.

JOHN E. TURNER, OF GREENVILLE, OHIO, ASSIGNOR OF ONE-HALF TO JOHN W. TROXELL, OF SAME PLACE.

WIRE-FENCE STAY.

SPECIFICATION forming part of Letters Patent No. 558,534, dated April 21, 1896.

Application filed March 18, 1895. Serial No. 542,174. (No model.)

*To all whom it may concern:*

Be it known that I, JOHN E. TURNER, of Greenville, county of Darke, State of Ohio, have invented a new and useful Improvement in Wire-Fence Stays; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in flexible or wire fences.

The object of the invention is to provide a stay for the line-wires of a fence that has all the advantages of a jointed or link stay as regards flexibility without possessing any of the disadvantages or undesirable features of a link-stay.

A further object of this invention is to provide a stay that has all the advantages of an inflexible stay without possessing the disadvantages of rigidity as a whole. In other words, the chief objection in the use of the link or jointed stay lies in the lack of resistance the upper and lower line-wires offer to the passage of animals. For example, swine rooting along the bottom of a fence which has its line-wires connected with short flexible stays find little difficulty in lifting the weight of one or two wires to gain an entrance to the inclosure, and in thus raising said wires the eyes of the stays become bent or the stays "foul" and a permanent passage is thereby made. The same objection may be raised as to the upper line-wires, where larger animals, such as horses or cattle, have a disposition to reach their heads over the fence, the top and adjacent wires being easily pressed down. These imperfections are overcome by the present invention, which consists of a continuous stay which unites the entire line-wires and possesses a sufficient amount of resiliency, as a whole, to impart to an entire panel of fence a certain degree of flexibility, which is essential to avoid the breaking of the fence when pressure is brought to bear upon it and to prevent the independent movement of one or two wires, as in the case of a link-stay.

Figure 2:
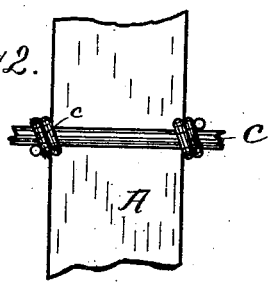
Figure 3:
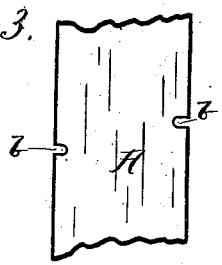
Figure 4:
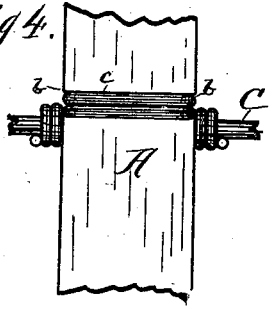
Figure 1:
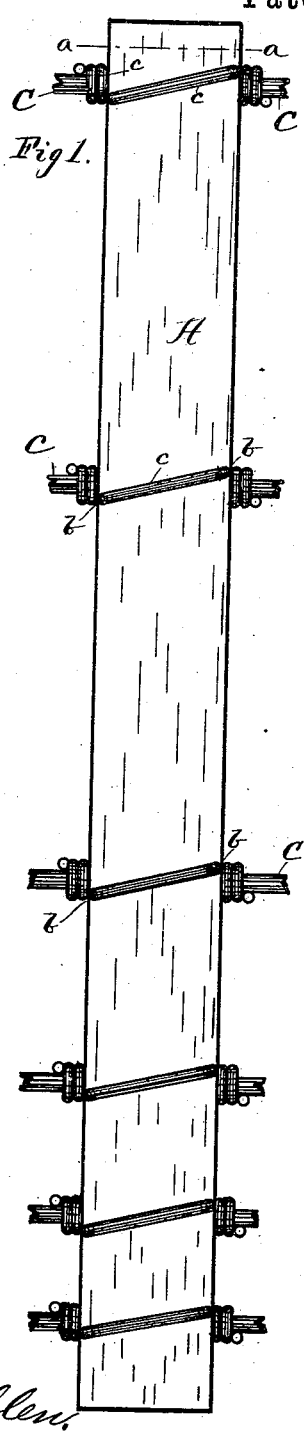
Figure 5:
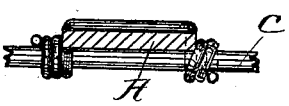
Figure 6:
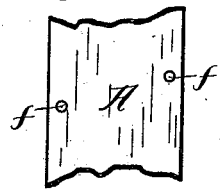
Figure 7:
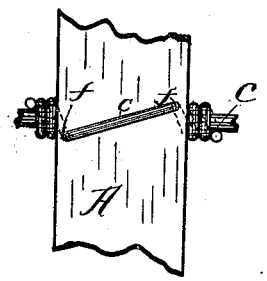

Referring to the annexed drawings, that form a supplemental part of this application, and upon which similar letters of reference indicate corresponding parts, Figure 1 is a side elevation of my improved stay. Fig. 2 is a rear elevation of Fig. 1, parts of the stay being broken away; Fig. 3, an elevation of the stay, parts broken away; Fig. 4, a view of a portion of the stay, showing a modification in the attachment of the binding-wires; Fig. 5, a section on the line $a\ a$ of Fig. 1; Fig. 6, a view of a portion of the stay, showing different means for attaching the binding-wires; Fig. 7, an elevation of part of a stay constructed in accordance with Fig. 6.

The letter A designates a metallic stay, preferably constructed of spring-steel of a width and thickness essential to impart thereto a resiliency or flexibility as a whole. As shown in Fig. 1, the stay is full size as to width and is of a length to reach from the bottom to the top line-wires of a fence.

$b$ designates notches cut in the longitudinal edges thereof, the notches on one edge being a little above or below those on the other edge, as is shown in Fig. 3.

C designates the horizontal wires that form the line-wires of a fence. These wires extend across each stay at points adjacent to the notches $b$ and are made fast to said stay by binding-wires $c$, that are passed through said notches $b$ and the ends thereof wrapped around said line-wires, as is shown in Fig. 1, where, it will be noted, the wrapping of the binding-wire $c$ begins at opposite sides or above and below the line-wire. When all of the line-wires are thus connected to said stays, the entire panel has a flexibility, and when any one or more wires thereof is pressed the pressure will not affect the fence unless it is sufficient to move the entire panel. The result is the entire panel is kept intact and cannot be disconnected or gotten out of shape by any of the ordinary causes, and the annoyance of fouling stays is avoided.

In Fig. 4 the notches $b$ on the stay are on a line with each other, and the wrapping of the binding-wires $e$ is commenced on the same side of the line-wire.

Figs. 6 and 7 show openings $f$ near the edges of the stay, that may be used instead of the notches *b* for attaching the binding-wires, as shown in Fig. 7.

Thus it will be seen this stay unites the entire panel, and any pressure against any part thereof will be borne by the entire panel of wires.

I am aware that it is not new to construct a stay for wire fences extending from the bottom to the top line-wires; but such stays have heretofore been of a rigid and unyielding nature, and owing to said rigidity and stiffness they offer little protection against the detachment or breakage of the line-wires. They become bent under pressure and have not the resilient nature described in the foregoing specification, therefore cannot resume their former shape or replace the line-wires in their former positions after the pressure has been removed from the latter.

Having fully described my invention, I claim as new and desire to secure by Letters Patent—

In combination with the line-wires of a fence, a series of thin spring-metal or resilient stays each of which reaches from the bottom to the top line-wires of said fence, and means for attaching each of said line-wires to said stays, whereby a resilient nature is imparted to an entire panel of the fence as a whole, and means are provided for preventing said wires from spreading when pressed by stock, as herein shown and described.

In testimony whereof I have hereunto set my hand this 12th day of March, 1895.

JOHN E. TURNER.

Witnesses:
D. LARST,
D. P. IRWIN.